US012477286B2

(12) United States Patent
Rosenkranz et al.

(10) Patent No.: US 12,477,286 B2
(45) Date of Patent: Nov. 18, 2025

(54) METHOD FOR DIRECTIONAL SIGNAL PROCESSING FOR A HEARING INSTRUMENT

(71) Applicant: Sivantos Pte. Ltd., Singapore (SG)

(72) Inventors: Tobias Daniel Rosenkranz, Erlangen (DE); Michael Bürger, Erlangen (DE); Sandro Kecanovic, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 320 days.

(21) Appl. No.: 18/347,751

(22) Filed: Jul. 6, 2023

(65) Prior Publication Data

US 2024/0015451 A1 Jan. 11, 2024

(30) Foreign Application Priority Data

Jul. 6, 2022 (DE) ..................... 10 2022 206 916.1

(51) Int. Cl.
*H04R 25/00* (2006.01)

(52) U.S. Cl.
CPC ........... *H04R 25/505* (2013.01); *H04R 25/43* (2013.01); *H04R 2225/43* (2013.01)

(58) Field of Classification Search
CPC ... H04R 25/505; H04R 25/43; H04R 2225/43
See application file for complete search history.

(56) References Cited

U.S. PATENT DOCUMENTS 6,697,494 B1 * 2/2004 Klootsema ........... H04R 25/505 381/91
8,949,120 B1 * 2/2015 Every ................. G10L 21/0208 704/226
11,070,923 B2 7/2021 Petrausch et al.
11,558,696 B2 1/2023 Rosenkranz
2022/0070579 A1 3/2022 Fischer et al.
2023/0007408 A1 * 1/2023 Puder ................... H04R 25/505
2023/0143325 A1 * 5/2023 Innes-Brown ......... H04R 25/43 381/71.6

FOREIGN PATENT DOCUMENTS

DE 102019205709 B3 7/2020
DE 102020209555 A1 2/2022
DE 102020210805 B3 2/2022

* cited by examiner

*Primary Examiner* — Suhan Ni
(74) *Attorney, Agent, or Firm* — Laurence A. Greenberg; Werner H. Stemer; Ralph E. Locher

(57) ABSTRACT

A method performs directional signal processing for a hearing instrument. First and second input signals are generated by first and second input transducers, respectively, from a sound signal. The first front intermediate signal and a first rear intermediate signal are each formed from the first and second input signals. A first superposition of the first front intermediate signal and the first rear intermediate signal is formed by a complex-value first superposition parameter and is adapted based on the first superposition parameter. A complex value of the first superposition parameter resulting from the adaptation of the first superposition is converted into a first alternative parameter and a second alternative parameter. An output signal is generated based on the first alternative parameter, the limited second alternative parameter and a superposition of the first and second input signals.

20 Claims, 4 Drawing Sheets

METHOD FOR DIRECTIONAL SIGNAL PROCESSING FOR A HEARING INSTRUMENT

CROSS-REFERENCE TO RELATED APPLICATION

This application claims the priority, under 35 U.S.C. § 119, of German Patent Application DE 10 2022 206 916.1, filed Jul. 6, 2022; the prior application is herewith incorporated by reference in its entirety.

FIELD AND BACKGROUND OF THE INVENTION

The invention relates to a method for directional signal processing for a hearing instrument. Wherein a first or second input signal is generated by a first or second input transducer of the hearing instrument from a sound signal of the surroundings. A first front intermediate signal and a first rear intermediate signal are each formed on the basis of the first and the second input signal. Wherein, in particular by frequency band, a first superposition of the first front intermediate signal and the first rear intermediate signal is formed by means of a first superposition parameter, and is adapted on the basis of the first superposition parameter. An output signal is generated on the basis of a value of the first superposition parameter and on the basis of a superposition, which is time-delayed in particular, of the first input signal and the second input signal.

In hearing instruments, such as hearing aids for the treatment of a hearing impairment of a wearer, a corresponding number of input signals, which represent the air pressure variations of the ambient sound at the respective input transducer, are generated from an ambient sound by a number of input transducers, such as microphones. An output signal is generated on the basis of the input signal or signals by a signal processing unit, which is converted by an output transducer of the hearing instrument (for example, a loudspeaker), into an output sound signal. The signal processing unit can preferably be adapted here to the audiological requirements of the wearer (thus, for example, a hearing difficulty), and can in particular include an amplification and/or compression by frequency band here.

In the case of two (or more) input transducers in a hearing instrument, moreover directional processing of the input signals thus generated can take place. In this way, for example as an intermediate signal during the generation of the output signal, a directional signal can be generated which is oriented onto an assumed useful signal source (usually a conversation partner or the like), and/or which suppresses interference sources by spatial “masking”.

Such masking can be carried out by means of a time-delayed superposition of the two input signals, or also by means of two different such superpositions, for example by means of a so-called cardioid signal and an anticardioid signal, which are in turn adaptively superimposed. One potential problem in this case, however, is that the most complete possible masking of an interference source in this case requires the most identical possible signal level in the two (or more) input transducers of the hearing instrument. This is often not provided as a result of shading effects both due to the head (or also parts of the outer ear) of the wearer, and due to the housing of the hearing instrument, because of which an input signal for complete masking of a directed interference source is to be adapted accordingly by a then angle-dependent amplification factor. Such an amplification factor is often difficult to ascertain, however. In addition, such an amplification factor can also result in strong variations of a useful signal, which is undesired. Moreover, the additional requirement that the masking of the interference source is often to be limited to a specific angle range with respect to the field of view of the wearer (for example to the rear half-space) represents still a further challenge.

SUMMARY OF THE INVENTION

The invention is therefore based on the object of specifying a method for directional signal processing for a hearing instrument, which is as robust as possible against different signal levels of the individual participating input signals, and which permits an efficient restriction of an angle of the minimal sensitivity of a resulting directional signal.

The mentioned object is achieved according to the invention by a method for directional signal processing for a hearing instrument. A first input signal is generated by a first input transducer of the hearing instrument from a sound signal of the surroundings. A second input signal is generated by a second input transducer of the hearing instrument from the sound signal of the surroundings, and a first front intermediate signal and a first rear intermediate signal are each formed on the basis of the first input signal and the second input signal, and preferably by a superposition, which is time-delayed in particular.

It is provided in this case that, in particular by frequency band, a first superposition of the first front intermediate signal and the first rear intermediate signal is formed by means of a complex-value first superposition parameter and is adapted on the basis of the first superposition parameter, wherein a complex value of the first superposition parameter resulting from the adaptation of the first superposition is converted into a corresponding pair of real-value alternative parameters, consisting of a first alternative parameter and a second alternative parameter. At least the second alternative parameter has an at least semicircular monotone relationship to an angle of minimal sensitivity of the first superposition and the angle of minimal sensitivity is modified via a corresponding modification of the second alternative parameter. A modified second alternative parameter is formed here, and an output signal is generated on the basis of the first alternative parameter and the modified second alternative parameter and on the basis of a superposition of the first input signal and the second input signal.

Embodiments which are advantageous and partially inventive as such are the subject matter of the dependent claims and the following description.

A hearing instrument in this case generally includes any device which is configured to generate at least two corresponding input signals by means of at least two input transducers, and to generate an output signal on the basis thereof by corresponding processing, which output signal is converted by an output transducer into an output sound signal and supplied to a sense of hearing of a wearer of this device. In particular, a headphone embodied having the corresponding input transducers (for example as an “earplug”), a headset, smart glasses with loudspeaker, etc. can be comprised in this case as a hearing instrument. However, a hearing aid in the narrower meaning is also comprised as a hearing instrument, thus a device for treating a hearing deficit of the wearer, in which the input signals generated by means of the input transducers from an ambient sound are processed in dependence on the audiological requirements of the wearer to form said output signal and in particular are amplified and/or compressed depending on frequency band for this purpose, so that the output sound signal is capable of at least partially compensating for the hearing deficit of the wearer, in particular in a user-specific manner.

An (in particular electroacoustic) input transducer in this case comprises any device which is provided and configured to generate a corresponding electrical signal (the associated input signal) from the sound signal of the surroundings, the voltage and current variations of which preferably represent the variations of the air pressure of the sound signal and reproduce them in the scope of the respective resolution. In particular, a microphone is comprised in this case as an input transducer.

In particular, the angle of minimal sensitivity as a modification is limited here to a specified angle range via corresponding limiting of the second alternative parameter, and a limited second alternative parameter is formed here as the modified second alternative parameter. An output signal is generated on the basis of the first alternative parameter and the limited second alternative parameter and on the basis of a superposition of the first input signal and the second output signal.

A minimal sensitivity (thus in particular a depth of a so-called "notch") at the corresponding angle can advantageously be modified on the basis of a modification, in particular a limiting, of the first alternative parameter.

The formation or generation of a resulting signal on the basis of one or more incoming signals is to be understood in particular to mean that the respective signal components of the incoming signal are incorporated, in particular by frequency band, according to a mapping rule in the relevant resulting signal, so that preferably a monotonous, particularly preferably linear relationship exists between the amplitudes and/or envelopes and/or signal levels of the incoming signals and the respective corresponding variable of the resulting signal.

The first front intermediate signal and the first rear intermediate signal are preferably each generated in this case on the basis of mapping rules symmetrical to one another, in particular as time-delayed superpositions, from the first and the second input signal, so that the directional characteristics of the two first intermediate signals, with respect to the free space, are symmetrical to one another. The first front intermediate signal and the first rear intermediate signal can also be generated, however, on the basis of mapping rules different from one another (in particular not symmetrical), wherein preferably the two mentioned intermediate signals are linearly independent of one another. In particular, it is conceivable that one of the intermediate signals has an omnidirectional directional characteristic.

The first superposition U1 is formed here in particular in the form $$U1(\omega,t)=Z1v(\omega,t)+a1(\omega,t)\cdot Z1h(\omega,t), \qquad \text{(i)}$$

wherein Z1$v$ and Z1$h$ respectively designate the first front and rear intermediate signal, $a1 \in \mathbb{R}$ designates the first superposition parameter, and ω and t are a frequency and a discrete time index, respectively.

The adaptation of the first superposition on the basis of the first superposition parameter contains in particular that the first superposition (the actual superposition, for example according to equation (i), is used here synonymously for the signal resulting from said superposition) is optimized with respect to a key variable such as the total energy, the total level, or a deviation from a reference signal, inter alia, via the first superposition parameter, wherein the optimization can also take place numerically in multiple steps, so that the first superposition parameter, even for a given time index, converges over the adaptation toward a value (which can be determined, for example, on the basis of a limiting value for a step width between two adaptation steps).

The value of the first superposition parameter, which thus generally includes a real part and an imaginary part, is now converted into a pair of real-value alternative parameters, thus a first alternative parameter and a second alternative parameter, wherein the latter has a monotonous relationship to an angle of minimal sensitivity of the first superposition.

This can in particular be motivated on the basis of the following consideration: For a preferably stationary sound signal, which is incident on the hearing instrument at an angle of θ with respect to its frontal direction (defined in particular on the basis of the direction from the second to the first input transducer), the relative transfer function from the first to the second input transducer (thus the amplitude and phase difference as a result of the propagation of the sound signal from the sound source at the angle θ to the second instead of to the first transducer) is $A_\theta \cdot e^{-i\omega\tau \cos\theta}$, wherein $A_\theta$ is an angle-dependent amplitude factor (which takes into consideration, among other things, shading effects due to the head of the wearer or due to the housing of the hearing instrument). With suitable selection of the two alternative parameters, in particular by a relationship between the value of the first superposition parameter and said relative transfer function, an at least semicircular monotonous relationship between the second alternative parameter and the angle of minimal sensitivity of the first superposition can be formed.

An at least semicircular monotonous relationship in particular includes that the relationship between the second alternative parameter and the angle of minimal sensitivity applies at least for an angle range of said angle which covers at least a semicircle, i.e., that a $\psi \in \mathbb{C}$ exists, so that the monotonous relationship applies at least for an angle range of $[\psi, \psi+\pi]$.

On the basis of the second alternative parameter, via the monotonous relationship (and possibly via a sign of the angle and/or a transformation of the angle of minimal sensitivity by π), this angle can be limited to a desired specified angle range, thus, for example, to the rear half-space (θ∈[90°, 270° ]), or a narrower "wedge" in the rear half-space (for example θ∈[120°, 240°]), in that the value range of the alternative second parameter is restricted to a corresponding interval (and possibly here a sign of said angle θ is taken into consideration with respect to the frontal direction or the 180° direction).

Due to the restriction of the angle of minimal sensitivity to the specified angle range, an adaptation of the alternative second parameter to the interval of the value range of this second alternative parameter corresponding to the angle restriction thus takes place, due to which in particular a generation of the limited second alternative parameter takes place. This limited second alternative parameter can preferably be identical to the second alternative parameter here when the associated angle θ of the minimal sensitivity is already within the specified angle range, or otherwise can be given by a limiting value of such an interval.

An output signal is now generated on the basis of the limited second alternative parameter and a superposition of the first and second input signal. This can be carried out in particular by a reversal of the calculation of the two alternative parameters from the first superposition parameter in such a way that an adapted first superposition parameter is formed on the basis of the first alternative parameter and the limited second alternative parameter, and accordingly the superposition of the two input signals to generate the output signal is given by the first superposition (which as a result of its generation from the first front and first rear intermediate signal does also represent a superposition of the two input signals), but now using the first adapted superposition parameter.

The output signal can be converted directly by an output transducer of the hearing instrument (such as a loudspeaker) into an output sound signal, which is supplied to the sense of hearing of the wearer of the hearing instrument. Alternatively thereto, the output signal of the method can pass through still further signal processing steps (such as further noise suppression and/or amplification or compression by frequency band), before the output sound signal is generated therefrom. In particular, a further signal can be admixed here to the output signal before the conversion into the output sound signal. Such a pair of alternative parameters can be formed in particular in that the first superposition U1 according to equation (i) is represented by a corresponding conversion in the basis of the two input signals as $$U1=E1\cdot w1+E2\cdot w2=E^T\cdot w \tag{ii}$$

with the vector of the input signals $E^T=(E1, E2)$ and the coefficient vector $w=(w\mathbf{1}, w\mathbf{2})^T$, wherein the coefficients w1 and w2 are dependent on the specific form of the generation of the first front and rear intermediate signal Z1*v*, Z1*h* in equation (i).

To obtain a better understanding of the coefficient vector w, the underlying adaptation of the first superposition U1 is assigned to a first-order finite impulse response filter (FIR filter), which then carries out a type of "spatial sampling" of the sound signal. The associated filter polynomial reads $$P(z)=w1+w2\cdot z^{-1}. \tag{iii}$$

The zero points of the polynomial in equation (iii) read z0=−w2/w1, and are uniquely defined except for a complex pre-exponential factor $c\in\mathbb{R}$. Accordingly, signals which differ from the first superposition U1 by such a scalar pre-exponential factor $c\in\mathbb{R}$, have the same properties as this with respect to their directional effect.

In view of the ambiguity of the zero point of the FIR filter according to equation (iii), which is assigned to the adaptation of the first superposition, the coefficient vector is now set to $w_0=c\cdot[1,-r\cdot e^{i\varphi}]$, wherein the relative phase φ and the quotient r of the absolute values of the two coefficients w2/w1, as already mentioned, are dependent on the specific embodiment of the first front and rear intermediate signal Z1*v*, Z1*h*. The first alternative parameter may now be formed on the basis of the quotient r (which thus specifies the ratio of the absolute values of the coefficients), and in particular as this, the second alternative parameter may be formed on the basis of the relative phase φ of the coefficients in relation to one another, and in particular as this.

This may be seen when, as mentioned above, a stationary sound signal is applied from an angle θ, which is to be attenuated as completely as possible.

Using the above-mentioned relative transfer function between the two input transducers, the vector E of the two input signals results as E=E1·h with $h=[1, A_\theta\cdot e^{-i\omega\tau\cos\theta}]^T$. Canceling the sound signal then requires in the present representation $$h_T\cdot w_0=0\text{, or} \tag{iv}$$

$$[1,A_\theta\cdot e^{-i\omega\tau\cos\theta}]\cdot[1,-r\cdot e^{i\varphi}]^T=0. \tag{iv'}$$

One solution which results from equation (vi') is $r=1/A_\theta$, $\varphi=\omega t\cdot\cos\theta$. It is clear from this that for $\theta\in[0,\pi]$, a monotonous relationship exists between the relative phase φ of the two coefficients w1, w2 of the first superposition (in the representation of the input signals) and the angle of the minimal sensitivity. This angle can now be limited via the relative phase φ as the second alternative parameter.

It has furthermore proven to be advantageous if the value of the first superposition parameter is converted into a corresponding real-value second superposition parameter and an associated value of a real-value amplification factor. The real-value amplification factor is assigned to a corresponding amplification of the second input signal in the formation of the first front or rear intermediate signal, and the second superposition parameter is adapted in such a way that for a second superposition, which is formed on the basis of the second superposition parameter from the first front intermediate signal and the first and rear intermediate signal with amplification of the second input signal by said amplification factor, the angle of minimal sensitivity is limited to the specified angle range, and in this way an adapted second superposition parameter is generated. On the basis of the adapted second superposition parameter and the amplification factor and on the basis of an in particular time-delayed superposition of the first input signal and the second input signal, the output signal is generated.

The real amplification factor $m\in\mathbb{C}$ corresponds here to an amplification of the second input signal in the formation of the first front or first rear intermediate signal. In other words, on the basis of the first superposition parameter $a\mathbf{1}\in\mathbb{R}$ (for the first superposition of the first front and the first rear intermediate signal), the amplification factor m and the second superposition parameter $a\mathbf{2}\in\mathbb{C}$ are thus ascertained in such a way that the first superposition merges here into a second superposition of the first front and the first rear intermediate signal, wherein in said first intermediate signals, the second input signal was in each case previously amplified by the amplification factor m, thus scaled, and wherein the second superposition of these intermediate signals is formed on the basis of the second superposition parameter $a\mathbf{2}\in\mathbb{C}$. In general, this conversion of real and imaginary part of $a\mathbf{1}\in\mathbb{R}$ according to $(a\mathbf{2}, m)\in\mathbb{C}^2$ is well defined.

It is not absolutely necessary here that the second superposition (thus the resulting signal) is actually formed (for example analogously to equation (i)); rather, it is sufficient here only to carry out the conversion a1→(a2, m) according to the restrictions (for example for the amplification factor) resulting in particular from the intermediate signals.

In the ideal case, the amplification factor is now determined here in such a way that a superposition of the first intermediate signals (with corresponding prior application of the amplification factor to the second input signal in the formation of the intermediate signals), enables complete masking of an interference source, and thus assumes the function of a level adaptation between the two input transducers of the hearing instrument. In this case, a monotonous relationship can now generally be established between the second superposition parameter a2 and the angle for which the above-mentioned second superposition:

$$U2(\omega,t)=Z2v(\omega,t)+a2(\omega,t)\cdot Z2h(\omega,t), \tag{i'}$$

has a minimal sensitivity or a maximal attenuation. In this case, in equation (i'), Z2*v* and Z2*h* designate a second front and second rear intermediate signal, respectively, which each originate from the first front or first rear intermediate signal by a prior amplification of the second input signal by said amplification factor.

As already described, a monotonous relationship can now be established between the angle of a maximum attenuation of the second superposition U2 and the second superposition parameter a2 (the monotony is, however, only defined in this case over angle ranges of a half circular rotation, thus for angles $\theta \in [\gamma, \gamma+\pi]$ with $\gamma \in \mathbb{C}$ ).

The second superposition parameter can in this case form the second alternative parameter, and the amplification factor can form the first alternative parameter. However, the first alternative parameter can also, as described on the basis of equation (iv'), be formed on the basis of the quotient r of the absolute values of the two coefficients w1, w2 of the first superposition with respect to the two input signals, and the second alternative parameter can be formed on the basis of the relative phase $\varphi$ of the two coefficients to one another. The adaptation of the second superposition parameter takes place on the basis of the alternative parameters r and $\varphi$, and the adapted second superposition parameter is thus formed.

On the basis of this adapted second superposition parameter and a superposition of the first and the second input signal, an output signal is now generated. The superposition of the first and the second input signal can be given here in particular by the second superposition (of the second front and second rear intermediate signal) according to equation (i'), wherein the adapted second superposition parameter a2' is to be used (instead of the "original" second superposition parameter a2). In the generation of the output signal, a correction filter can in particular also be added for the frequency response, in order to ensure a flat frequency response, for example, in the frontal direction (defined, for example, by the direction from the second to the first input transducer of the hearing instrument). The correction filter can in particular also be given by a frequency-dependent correction factor in the case that the time delay in the relevant superpositions is implemented on the basis of a frequency factor.

In particular, a second front intermediate signal and a second rear intermediate signal are thus each formed on the basis of the first input signal and the second input signal scaled by means of the real-value amplification factor, preferably by an in particular time-delayed superposition, wherein the output signal is generated on the basis of the second superposition using the adapted second superposition parameter.

The superposition of the two input signals to generate the output signal can also be given, however, by the first superposition according to equation (i), wherein, however, the amplification factor m and the adapted second superposition factor a2' are mapped back again onto the then "adapted" value for the second superposition parameter a1', in particular by means of the inverted mapping rule (a2', m)→a1'.

Preferably, the first rear intermediate signal is formed in such a way that in a frontal direction, which is in particular defined on the basis of a direction from the second input transducer to the first input transducer, it has a relative attenuation, and the first front intermediate signal is formed in such a way that it has a relative attenuation in a direction opposite to the frontal direction. In particular, the first front and the first rear intermediate signal are symmetrical to one another. In particular, this statement also applies to the second front and second rear intermediate signal. A relative attenuation is in particular to be understood as a minimum of the sensitivity which is local and is preferably global over all angles. This minimum does not necessarily have to mean a maximum attenuation in terms of total masking here, rather it can in particular also assume finite values for the respective sensitivity for the first intermediate signals.

The first front intermediate signal and the first rear intermediate signal are advantageously each generated on the basis of a time-delayed superposition of the two input signals, wherein in this case the second input signal is delayed for the first front intermediate signal and the first input signal is delayed for the first rear intermediate signal, preferably in each case by the acoustic run time between the two input transducers. In this way, directional signals are generated as the first intermediate signals, which have a cardioid-shaped or anticardioid-shaped directional characteristic in free space, and are particularly suitable for the present method as a result of the simple and nonetheless stable generation.

In this case, a delay between the input signals, in particular in the time-frequency domain, is expediently implemented by means of an in particular additional all-pass filter at least in a frequency band preferably up to a band limiting frequency of up to 500 Hz. In the time-frequency domain, a delay may be implemented via a phase factor, which is dependent on the center frequency of the relevant frequency band. Depending on the implementation, however, this center frequency for the first frequency band can be 0 Hz, so that no delay would be possible. In this case, an alternative implementation of the delay via an all-pass filter is favorable. This can also be advantageous for other, lower frequency bands, however, if the phase has large changes within a frequency band, which are only inadequately mapped using a constant phase factor over the relevant frequency band.

It has furthermore proven to be advantageous if, in a first adaptation step, a first value of the complex first superposition parameter is ascertained, the first value of the first superposition parameter is converted into the corresponding first and second alternative parameters, and the limited second alternative parameter is ascertained therefrom, a second value of the first superposition parameter is ascertained on the basis of the first alternative parameter and the limited second alternative parameter, and the second value of the first superposition parameter is used for a second adaptation step. In other words, it is not necessary for the restriction of the angle range for the angle of the minimum sensitivity of the second superposition not to take place after the complete termination of the adaptation of the first superposition parameter. Rather, such a restriction can also take place in a single adaptation step, and the limited second alternative parameter can form the basis for the next adaptation step.

The first superposition parameter is advantageously ascertained by means of a least mean squares algorithm and/or by means of a gradient method. These mentioned methods are particularly suitable for adapting the complex-value first superposition parameter having real part and imaginary part, thus in particular to optimize the associated first superposition with respect to a key variable via the first superposition parameter. The gradient method can in this case in particular comprise an application of a gradient of the real part and imaginary part with respect to such a key variable (such as a signal level or a deviation from an error signal or reference signal).

The invention furthermore mentions a hearing instrument, containing a first input transducer for generating a first input signal from a sound signal of the surroundings, a second input transducer for generating a second input signal from the sound signal of the surroundings, and a control unit. The hearing instrument is configured to carry out the above-described method. The hearing instrument is configured in this case in particular by means of the control unit to carry out the method steps, in each of which processing of one of the input signals or signals derived therefrom takes place.

The control unit is in particular equipped with at least one signal processor for this purpose.

The hearing instrument according to the invention shares the advantages of the method according to the invention. The advantages indicated for the method and for its refinement can be transferred accordingly to the hearing instrument.

Other features which are considered as characteristic for the invention are set forth in the appended claims.

Although the invention is illustrated and described herein as embodied in a method for directional signal processing for a hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and variables corresponding to one another are each provided with the same reference signs in all figures.

Figure 1:
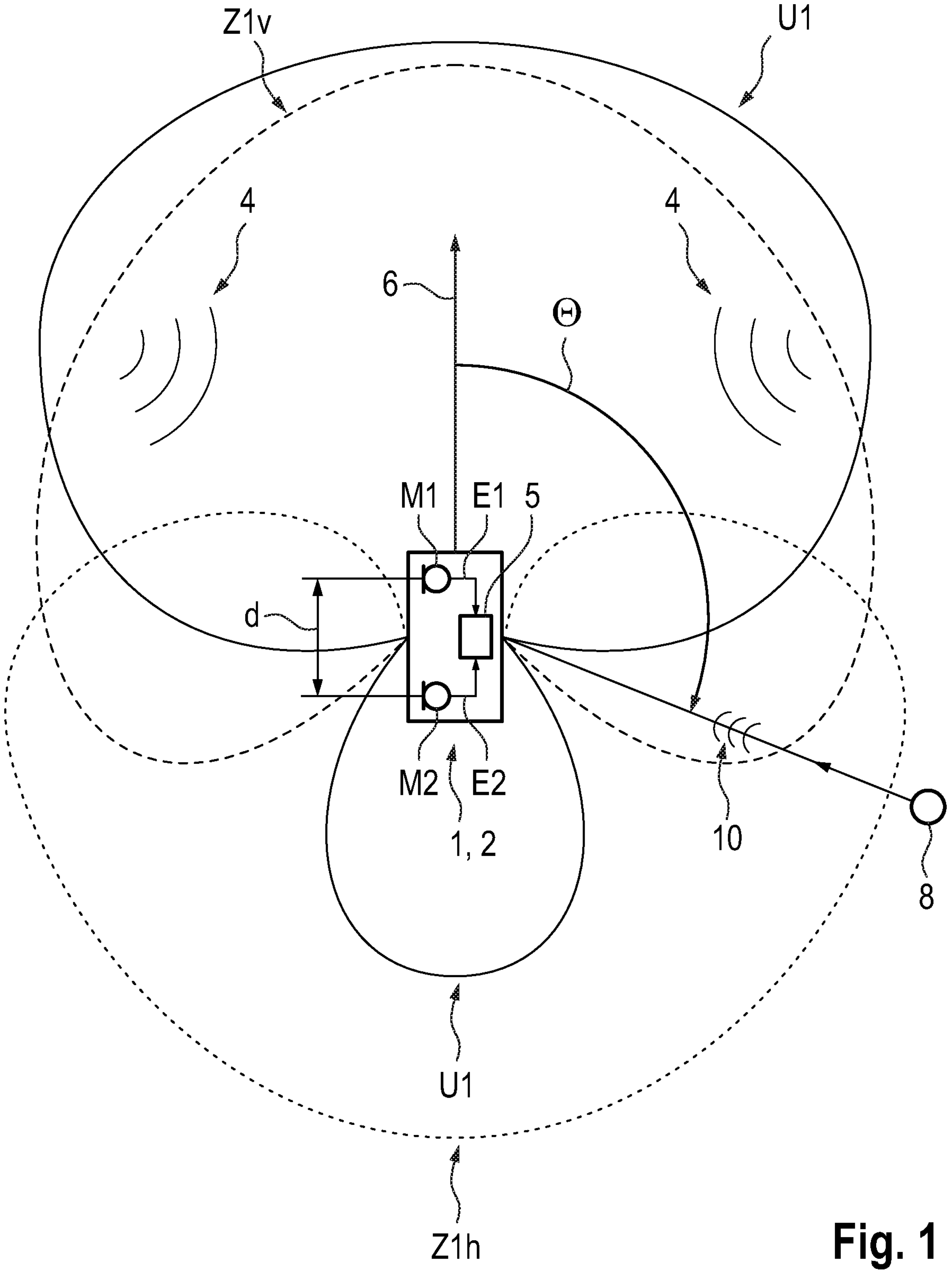
FIG. 1 is an illustration showing directional characteristics of intermediate signals of a hearing instrument in a top view.

Referring now to the figures of the drawings in detail and first, particularly to FIG. 1 thereof, there is schematically shown directional characteristics for a hearing instrument 1 in a top view. The hearing instrument 1 is configured here as a hearing aid 2, which is provided and configured for the treatment of a hearing deficit. The hearing instrument 1 includes a first input transducer M1 and a second input transducer M2, which are arranged at the distance d from one another, and are each provided in the present case by corresponding microphones. From a sound signal 4 of the surroundings, a first input signal E1 is generated by the first input transducer M1, and a second input signal E2 is generated by the second input transducer M2. Furthermore, the hearing instrument 1 includes a control unit 5, which is configured for processing said input signals E1, E2, and in particular comprises a signal processor (not shown in detail) for this purpose.

On the basis of a time-delayed superposition of the first input signal E1 and the second input signal E2, a first front intermediate signal Z1$v$ is generated, wherein the time delay corresponds precisely to the acoustic time-of-flight of the distance d:

$$Z1v(\omega,t)=E1(\omega,t)-E2(\omega,t-\tau),\text{ or} \tag{v}$$

$$Z1v(\omega,t)=E1(\omega,t)-e^{-i\omega\tau}E2(\omega,t). \tag{v'}$$

In the ideal case, that the signal levels of the first and the second input signal E1, E2 are identical (and in particular no shading effects and no attenuation over the distance d take place), the first front intermediate signal has a cardioid-shaped directional characteristic (dashed line). In a manner comparable to equation (v) or (v'), but with delay of the first input signal E1, a first rear intermediate signal Z1$h$=$e^{-i\omega\tau}$E1−E2 is generated. In the above-mentioned ideal case, the first rear intermediate signal Z1$v$ has an anticardioid-shaped directional characteristic (dotted line), which has its maximum attenuation in a frontal direction 6. The direction of maximum attenuation of the first front intermediate signal Z1$v$ is opposite to the frontal direction 6.

A first superposition U1 is now formed according to equation (i) from the first front and the first rear intermediate signal on the basis of a complex-value first superposition parameter a1$\in\mathbb{R}$, wherein the value of the first superposition parameter a1 (thus its real part and imaginary part) is determined by an adaptation of the first superposition U1, for example by minimizing the signal energy or the level by means of a gradient method. An interference source 8, which contributes a directed interference sound 10 to the sound signal 4 of the surroundings, can now be "masked" by means of the first superposition U1, as shown by the directional characteristic of the first superposition U1 (solid line). This directional characteristic has the maximum attenuation at the angle θ, in which the interference source 8 now lies.

However, if the signal level for the two input signals E1, E2 is not equal, for example as a result of shading effects (for example due to the head and/or the pinna of the wearer of the hearing instrument 1, but also due to the housing of the hearing instrument 1), depending on the type of these shading effects, for example, the attenuation for the first rear intermediate signal Z1$h$ in the frontal direction 6 can no longer be complete, but rather has a finite value. This can apply accordingly, depending on the specific level differences of the input signals E1, E2, for the first front intermediate signal Z1$v$. In this way, complete attenuation and therefore also complete masking of the interference sound 10 can possibly no longer be achieved on the basis of the first superposition U1 in the direction of the interference source 8.

Figure 2:
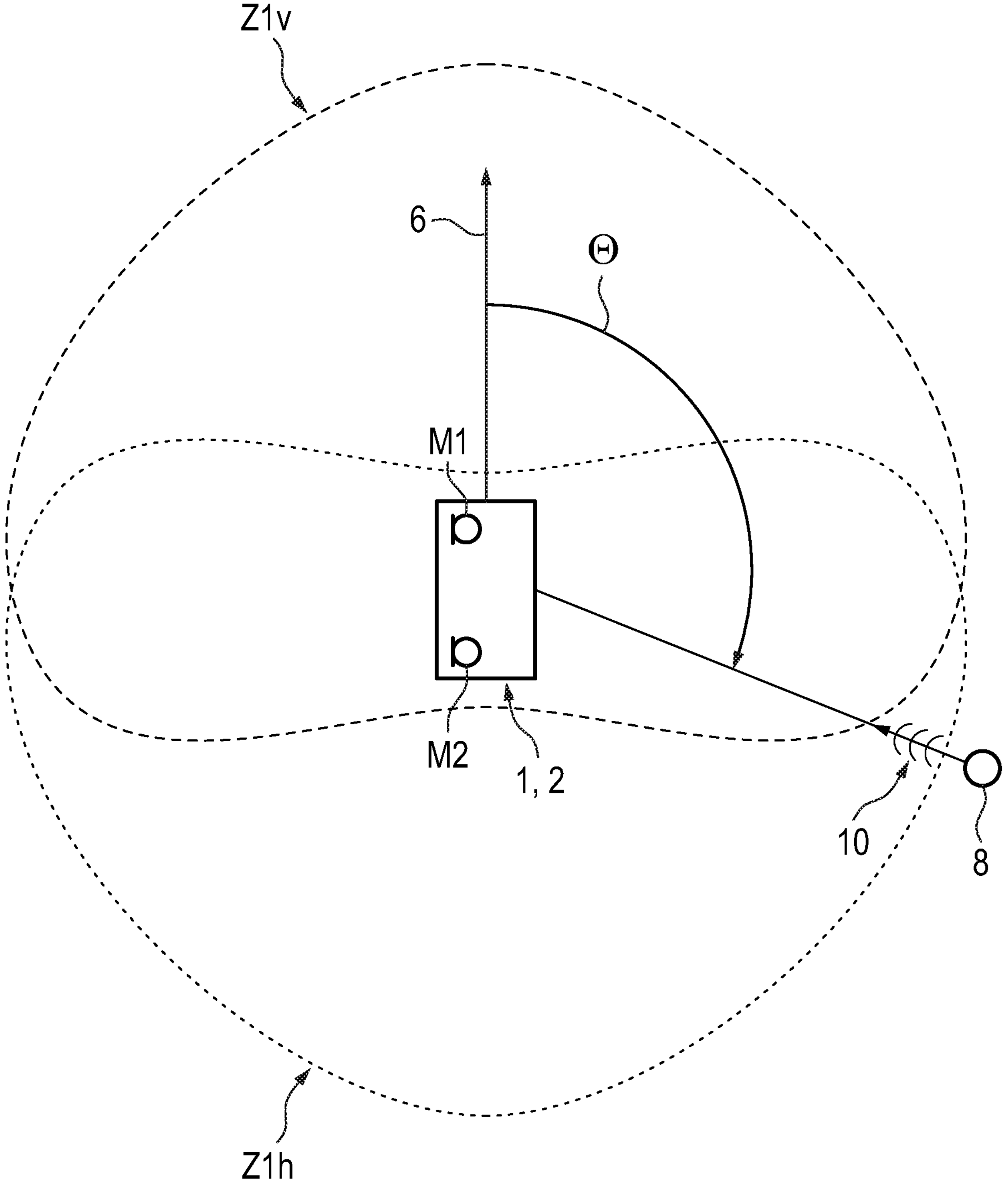
FIG. 2 is an illustration of the directional characteristics of the intermediate signals according to FIG. 1 in the case of unequal signal levels of the input transducers in a top view.

This state of affairs is schematically shown in a top view in FIG. 2. The first front intermediate signal Z1$v$ (dashed line) and the first rear intermediate signal Z1$h$ now each have a directional characteristic which in some directions no longer enables complete attenuation. For this reason, the first superposition U1 (not shown), formed according to equation (i) on the basis of the first front and rear intermediate signal Z1$v$, Z1$h$ according to FIG. 2, is not capable in the present case of completely masking the interference source 8 either.

Figure 3:
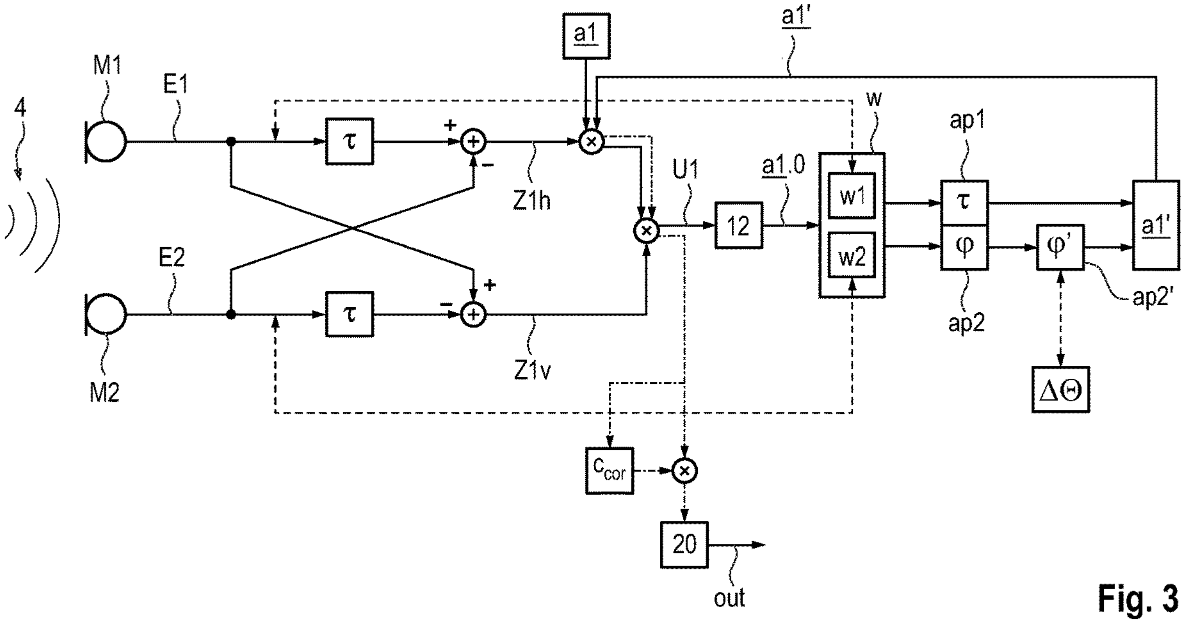
FIG. 3 is a block diagram showing a sequence of a method for directional signal processing in the hearing instrument.

To remedy this problem, a method is proposed which is shown on the basis of a block diagram in FIG. 3. In FIG. 3, the sound signal 4 of the surroundings according to FIG. 1, which comprises the interference sound 10 of the directed interference source 8 (each not shown), is converted by the first and second input transducer M1, M2 into the first and second input signal E1, E2, respectively. From the two input signals E1, E2, the first front and first rear intermediate signal Z1$v$, Z1$h$ are each formed by time-delayed superposition (see description of FIG. 1, in particular equation (ii')):

$$Z1v=E1-e^{-i\omega\tau}E2, \tag{v''}$$

$$Z1h=e^{-i\omega\tau}E1-E2. \tag{vi}$$

In general, the signal levels of the first and second input signal E1, E2 are not equal, so that the first front and first rear intermediate signal Z1*v*, Z1*h* have directional characteristics comparable to those shown in FIG. 2.

On the basis of a complex first superposition parameter a1∈C, a first superposition U1 is now formed according to equation (i) from the first front and the first rear intermediate signal Z1*v*, Z1*h*. This first superposition U1 is subjected to an adaptation 12, in which a specific value a1.0 for the first superposition parameter a1 is ascertained. The adaptation 12 can be carried out, for example, in a minimization of the signal energy of the first superposition U1 by a gradient method with respect to the real part and imaginary part of the first superposition parameter a1 or the like.

According to equations (i), (v") and (vi), the following results for the first superposition U1:

$$U1 = E1\cdot\left(1+\underline{a1}\ e^{-i\omega\tau}\right) - E2\cdot\left(e^{-i\omega\tau}+\underline{a1}\right) \qquad \text{(vii)}$$
$$= E1\cdot w1 + E2\cdot w2,$$
$$U1 = E^T\cdot w. \qquad \text{(ii)}$$

with the vector of the input signals $E^T$=(E1, E2) and the coefficient vector w=(w1, w2)$^T$, wherein the specific form of the coefficients w1 and w2 is now given by equation (vii).

For the further procedure, therefore the coefficient vector w according to equation (vii) is now brought into the form $w_0$ according to equation (iv'), wherein $$r\ e^{i\phi} = \frac{e^{-i\omega\tau}+\underline{a1}}{1+\underline{a1}\ e - i\omega\tau} \qquad \text{(viii)}$$

results. The relative phase φ simply results here from the argument of the right side of equation (viii), the factor r is given by the quotient r of the absolute values of the coefficients w2/w1 according to equation (vii). The latter is now used as a first alternative parameter ap1, the relative phase φ as a second alternative parameter ap2. These can now be used according to the relationship $e^{i\varphi-i\omega\tau\ \cos\ \theta}$ resulting from equation (iv') to delimit an angle range Δθ for the angle θ, due to which a limited relative phase (pc or a limited alternative second parameter ap2' results. In particular, this limited relative phase (pc can be identical to the relative phase φ if the angle θ of the minimal sensitivity of the first superposition U1 is already in the desired angle range Δθ (for example the rear half-space with respect to the frontal direction 6).

Due to the adapted relative phase (pc, a corresponding adaptation of the first superposition parameter a1 also takes place in equation (viii). The equation (viii) can then be solved for this adapted first superposition parameter a1' as $$\underline{a1'} = \frac{e^{-i\omega\tau} - r\ e^{i\phi'}}{r\ e^{i\phi'-i\omega\tau} - 1}.$$

On the basis of the first superposition U1' (dot-dash line) thus adapted using the adapted first superposition parameter a1', an output signal out can now be generated, wherein the adapted first superposition U1', inter alia, is in particular also multiplied by a correction factor $c_{cor}$ for correcting the frequency response, so that in the frontal direction 6, the frequency response of the output signal out is flat. In addition, still further signal processing steps 20, such as noise or feedback suppression, etc., but also frequency-dependent boosting depending on the audiological specifications of the wearer or the like, can also be interposed.

Figure 4:
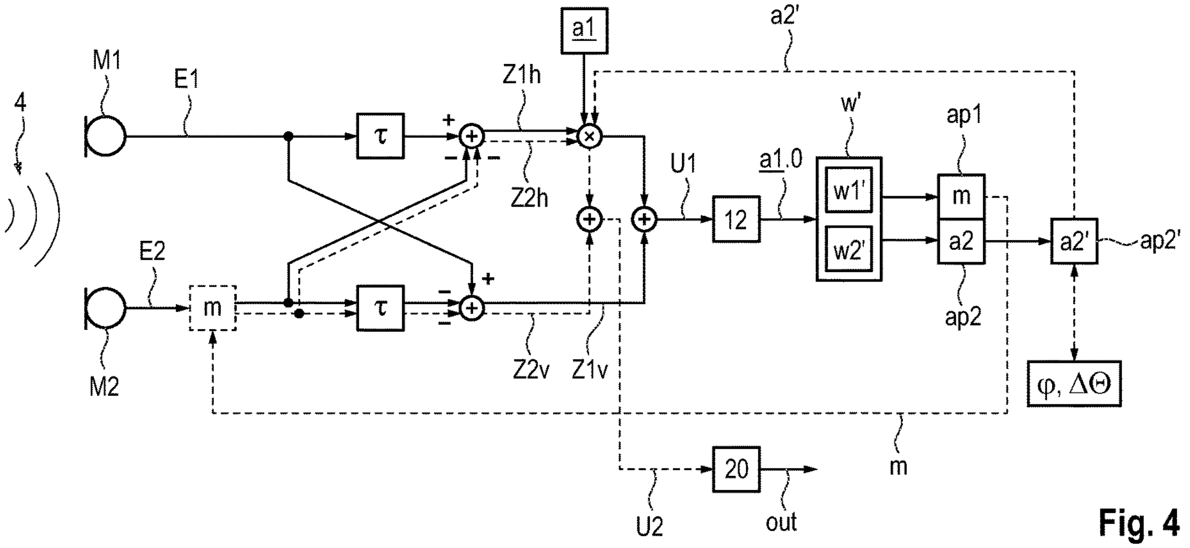
FIG. 4 is a block diagram of an alternative embodiment to the method according to FIG. 3.

An alternative embodiment of the method according to FIG. 3 is shown on the basis of a block diagram in FIG. 4. As in that case, the first superposition U1 is formed on the basis of the first superposition parameter a1, and the value a1.0 of the first superposition parameter a1 is ascertained in the adaptation 12. In a next step, the value a1.0 of the first superposition parameter a1 is now mapped on a real-value second superposition parameter a2∈ℂ and a real-value amplification factor m∈ℂ, wherein the latter is assigned to the second input signal E2.

To be able to determine the relationship between the first superposition parameter a1 (or its value a1.0) and the specific values of the second superposition parameter a2 and the amplification factor m, a second front intermediate signal Z2*v* and a second rear intermediate signal Z2*h* are defined (dashed signal path), in which, however, the amplification factor m is applied in each case to the second input signal E2, thus $$Z2v = E1 - m\cdot e^{-i\omega\tau}E2,$$
$$Z2h = e^{-i\omega\tau}E1 - m\cdot E2. \qquad \text{(ix)}$$

A different signal level between the first and the second input signal E1, E2 can be compensated for by this amplification factor. Even in the case of different signal levels, the second front and the second rear intermediate signal Z2*v*, Z2*h* therefore have the directional characteristics shown in FIG. 1, which no longer apply for the first front and first rear intermediate signal Z1*v*, Z1*h* in the general case (thus not in free space, rather with shading effects, etc.) (for this general case, these directional signals have directional characteristics according to FIG. 2 as described).

If one now forms from said second front and second rear intermediate signal Z2*v*, Z2*h* (which differ from the corresponding first front or first rear intermediate signal Z1*v*, Z1*h* in each case by said amplification factor m in the component of the second input signal E2), a second superposition U2 on the basis of the second superposition parameter a2 (dashed signal path) analogously to equation (i), the following therefore applies for this:

$$U2 = E1\cdot\left(1+a2\ e^{-i\omega\tau}\right) - m\cdot E2\cdot\left(e^{-i\omega\tau}+a2\right) \qquad \text{(x)}$$
$$= E1\cdot w1' + E2\cdot w2', \text{ and therefore}$$
$$U2 = E^T\cdot w'. \qquad \text{(x')}$$

The amplification factor m and the second superposition parameter a2 are to be determined here in such a way that a restriction of the angle θ of the maximum attenuation (see FIG. 1) to a desired angle range is to be enabled by the representation.

In a manner analogous to equations (vii') and (viii), from equation (x), with the consideration, motivated from equations (iii) and (iv'), of the relationship between the relative phase φ and the coefficient quotient r=|w2'/w1'|, on the one hand, and the amplification factor m as a first alternative parameter ap1 and the second superposition parameter a2 as a second alternative parameter ap2, on the other hand, the following is produced:

$$r\ e^{i\phi} = m\frac{e^{-i\omega\tau}+a2}{1+a2\ e - i\omega\tau} \qquad \text{(xi)}$$

It was utilized in this case that zero points of the polynomial in equation (iii) are only defined up to a factor $c \in \mathbb{R}$, due to which w2/w1=w2*c*/w1' follows. Since the fraction on the right side is of the absolute value 1, m=r results for the amplification factor, wherein r is given on the basis of the value a1.0 of the first superposition parameter a1 by the absolute value of equation (viii).

For the second superposition parameter a2 as the second alternative parameter ap2 of the method according to FIG. 4, the following results from equation (xi):

$$a2 = \frac{e^{-i\omega\tau} - e^{i\phi}}{e^{i\phi - i\omega\tau} - 1} = \frac{\cos\phi - \cos(\omega\tau)}{1 - \cos(\phi - \omega\tau)}$$

On the basis of corresponding tabulated values, via the relationship between φ (the relative phase of the coefficients w1 'and w2' in equation (x)) and the angle θ, the minimal sensitivity of the first superposition U1 ($e^{i\varphi - i\omega\tau \cos\theta}$=1, see equation (iv')) and therefore also of the second superposition U2, (which initially only represents a conversion of the first superposition U1) can be produced.

A corresponding adapted value for the second superposition parameter a2, thus an adapted second superposition parameter a2' or a limited second alternative parameter ap2' may be determined therefrom.

The output signal out can now be formed (possibly after further signal processing steps 20 and correction factors (not shown) of the frequency response) from the second superposition U2 according to equation (V) using the second front and second rear intermediate signal Z2*v*, Z2*h* according to equation (ix), but on the basis of the adapted second superposition parameter a2' (instead of, as in equation (V), on the basis of the second superposition parameter a2). The amplification factor m in the second front and second rear intermediate signal Z2*v*, Z2*h* according to equation (ix) results here as r=m according to equation (xi) with r according to equation (viii) from the first superposition parameter a1.

The amplification factor m and the adapted second superposition parameter a2' can also be back calculated again into the domain of the first superposition parameter a1 (not shown) however, so that the output signal out is then formed in this case from a first superposition on the basis of the adapted first superposition parameter a1' thus ascertained. This procedure has the advantage that a pre-exponential factor in the output signal out, which corrects a high-pass behavior in the frequency response of the first superposition U1, is independent of the angle θ of the minimal sensitivity.

Although the invention was illustrated and described in more detail by the preferred exemplary embodiment, the invention is not thus restricted by the disclosed examples and other variations can be derived therefrom by a person skilled in the art without departing from the scope of protection of the invention.

The following is a summary list of reference numerals and the corresponding structure used in the above description of the invention.

LIST OF REFERENCE SIGNS

1 hearing instrument
2 hearing aid
4 sound signal (of the surroundings)
5 control unit
6 frontal direction
8 interference source
10 interference sound
12 adaptation
20 signal processing steps
a1(') (adapted) first superposition parameter
a2(') (adapted) second superposition parameter
ap1, ap2 first and second alternative parameter
ap2' limited second alternative parameter
$c_{cor}$ correction factor
E1, E2 first and second input signal
M1, M2 first and second input transducer
out output signal
m amplification factor
r quotient (of the absolute values of the coefficients)
U1, U2 first and second superposition
w1('), w2(') coefficients
Z1*v*, Z1*h* first front and first rear intermediate signal
Z2*v*, Z2*h* second front and second rear intermediate single
Δθ angle range
θ angle (of minimal sensitivity)
τ time delay
φ relative phase (of the coefficients)

The invention claimed is:

1. A method for directional signal processing for a hearing instrument, the method comprises the steps of:
- generating a first input signal by a first input transducer of the hearing instrument from a sound signal from surroundings;
- generating a second input signal by a second input transducer of the hearing instrument from the sound signal of the surroundings;
- forming each of a first front intermediate signal and a first rear intermediate signal on a basis of the first input signal and the second input signal;
- forming a first superposition of the first front intermediate signal and the first rear intermediate signal by means of a complex-value first superposition parameter, and is adapted on a basis of the complex-value first superposition parameter;
- converting a complex value of the complex-value first superposition parameter resulting from an adaptation of the first superposition into a corresponding pair of real-value alternative parameters, containing a first alternative parameter and a second alternative parameter, wherein at least the second alternative parameter has an at least semicircular monotonous relationship to an angle of minimal sensitivity of the first superposition;
- modifying the angle of minimal sensitivity via a corresponding modification of the at least one second alternative parameter, and a modified second alternative parameter is formed here; and
- generating an output signal on a basis of the first alternative parameter and the modified second alternative parameter and on a basis of a superposition of the first input signal and the second input signal.

2. The method according to claim 1, wherein:
- the angle of minimal sensitivity is limited as a modification to a specified angle range via a corresponding delimitation of the second alternative parameter, and a limited second alternative parameter is formed here as the modified second alternative parameter; and
- the output signal is generated on the basis of the first alternative parameter and the limited second alternative parameter and on the basis of the superposition of the first input signal and the second input signal.

3. The method according to claim 2, wherein:

in a first adaptation step, ascertaining a first value of the complex-value first superposition parameter;

the first value of the complex-value first superposition parameter is converted into corresponding said first and second alternative parameters, and the limited second alternative parameter is ascertained therefrom;

a second value of the complex-value first superposition parameter is ascertained on a basis of the first alternative parameter and the limited second alternative parameter; and the second value of the complex-value first superposition parameter is used for a second adaptation step.

4. The method according to claim 1, which further comprises modifying the minimal sensitivity at a corresponding said angle on a basis of a modification of the first alternative parameter.

5. The method according to claim 1, which further comprises:

forming a coefficient vector of two coefficients of the first input signal and of the second input signal in the first superposition;

forming the first alternative parameter on a basis of a quotient of absolute values of the two coefficients; and forming the second alternative parameter on a basis of a relative phase of the two coefficients in relation to one another.

6. The method according to claim 5, which further comprises:

forming an adapted first superposition parameter on a basis of the first alternative parameter and the limited second alternative parameter; and forming the superposition for generating the output signal by the first superposition on a basis of the adapted first superposition parameter.

7. The method according to claim 5, wherein:

a value of the complex-value first superposition parameter is converted into a corresponding real-value second superposition parameter and an associated value of a real-value amplification factor, wherein the real-value amplification factor is assigned to a corresponding amplification of the second input signal in a formation of the first front or rear intermediate signal;

the corresponding real-value second superposition parameter is adapted such that for a second superposition, which is formed on a basis of the second superposition parameter from the first front intermediate signal and the first rear intermediate signal with amplification of the second input signal by the real-value amplification factor, the angle of minimal sensitivity is limited to a specified angle range and an adapted second superposition parameter is generated in this way; and the output signal is generated on a basis of the adapted second superposition parameter and the real-value amplification factor and on a basis of the superposition of the first input signal and the second input signal.

8. The method according to claim 7, which further comprises:

using the second superposition parameter as the second alternative parameter; and using the real-value amplification factor as the first alternative parameter.

9. The method according to claim 7, which further comprises:

forming the first alternative parameter on the basis of the quotient of the absolute values of the two coefficients of the first input signal and the second input signal in the first superposition; and forming the second alternative parameter on the basis of the relative phase of the two coefficients in relation to one another, and wherein the adaptation of the corresponding real-value second superposition parameter takes place on a basis of the first alternative parameter and the limited second alternative parameter, and the adapted second superposition parameter is thus formed.

10. The method according to claim 9, which further comprises:

forming, on a basis of the first input signal and the second input signal scaled by means of the real-value amplification factor, each of a second front intermediate signal and a second rear intermediate signal; and generating the output signal on a basis of the second superposition using the adapted second superposition parameter.

11. The method according to claim 7, which further comprises generating the output signal on a basis of the first superposition, wherein for this purpose the complex value of the adapted first superposition parameter is ascertained on a basis of the adapted second superposition parameter and on a basis of the real-value amplification factor.

12. The method according to claim 1, wherein:

the first rear intermediate signal has a relative attenuation in a frontal direction; and the first front intermediate signal has a relative attenuation in a direction opposite to the frontal direction.

13. The method according to claim 12, which further comprises:

generating each of the first front intermediate signal and the first rear intermediate signal on a basis of a time-delayed superposition of the first and second input signals, wherein the second input signal is delayed for the first front intermediate signal and the first input signal is delayed for the first rear intermediate signal here.

14. The method as claimed in claim 13, wherein a delay is implemented by means of an all-pass filter at least in one frequency band.

15. The method according to claim 12, wherein the first rear intermediate signal has the relative attenuation in the frontal direction which is defined on a basis of a direction from the second input transducer to the first input transducer.

16. The method according to claim 1, which further comprises ascertaining the complex-value first superposition parameter by means of a least mean squares algorithm and/or by means of a gradient method.

17. The method according to claim 1, wherein the output signal is additionally generated by superposition of the first and the second input signal on a basis of a correction filter for a frequency response.

18. The method as claimed in claim 17, wherein the correction filter for the frequency response is selected such that the frequency response is flat for a frontal direction.

19. The method according to claim 1, wherein the forming of the first superposition is performed by use of a frequency band.

20. A hearing instrument, comprising:

a first input transducer for generating a first input signal from a sound signal of a surrounding environment;

a second input transducer for generating a second input signal from the sound signal of the surrounding environment; and a controller, wherein the hearing instrument is configured to carry out a method according to claim 1.

* * * * *